United States Patent

[11] 3,597,994

| | | | | | |
|---|---|---|---|---|---|
| [72] | Inventors | Masanao Shiomi<br>Toyota-shi;<br>Tadataka Narumi, Kariya-shi, both of,<br>Japan | 3,504,567 | 4/1970 Ohashi et al. | 74/492 |
| | | | 3,505,897 | 4/1970 Scheffler et al. | 74/492 |
| [21] | Appl. No. | 862,254 | | | |
| [22] | Filed | Sept. 30, 1969 | | | |
| [45] | Patented | Aug. 10, 1971 | | | |
| [73] | Assignee | Toyota Jidosha Kogyo Kabushiki Kaisha<br>Aichi-ken, Japan | | | |
| [32] | Priority | Oct. 5, 1968 | | | |
| [33] | | Japan | | | |
| [31] | | 43/72548 | | | |

Primary Examiner—Milton Kaufman
Attorney—Berman, Davidson and Berman

[54] STEERING DEVICE WITH ENERGY ABSORBER
5 Claims, 13 Drawing Figs.

[52] U.S. Cl. ........................................... 74/492
[51] Int. Cl. ........................................... B62d 1/18
[50] Field of Search .............................. 74/492, 493

[56] References Cited
UNITED STATES PATENTS
3,475,984  11/1969  Ward ............................ 74/492

ABSTRACT: A steering wheel assembly including an extensible steering shaft whose upper end is connected to a steering wheel and the lower end is connected to a gearbox, a tubular steering column also having telescopic portions arranged coaxially about the steering shaft and movable in the axial direction thereof with the shaft, and an energy-absorbing member capable of plastic deformation in one direction only, either under tension or compression, and being rigid in the opposite direction, said energy-absorbing member positioned beside the steering column and fixed at its lower end to a portion of the tubular steering column and fixed at the other end to a portion of the vehicle. Preferably, said energy-absorbing member is mounted at an angle to the axis of the steering shaft so as to kinetically balance an angular collision force and thereby prevent bending of the shaft.

INVENTORS.
MASANAO SHIOMI,
TADATAKA NARUMI,

BY
Berman, Davidson & Berman,
ATTORNEYS.

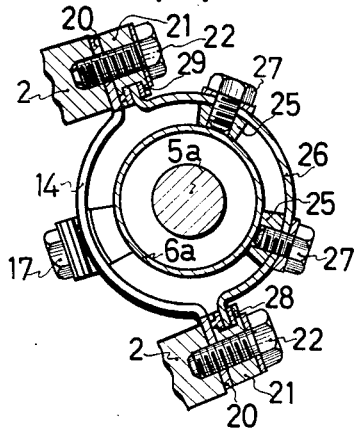
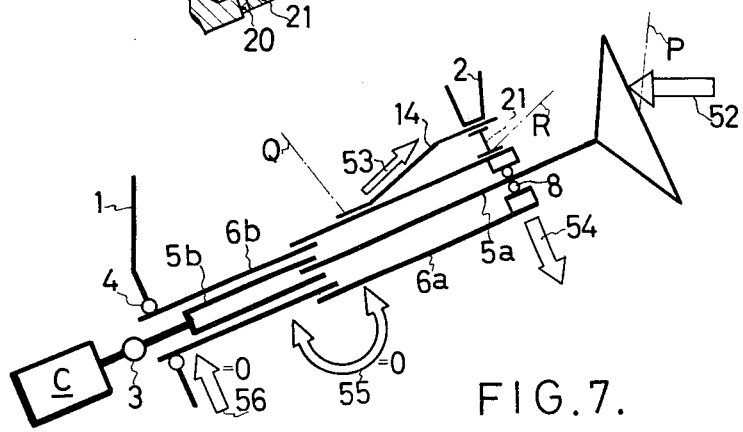
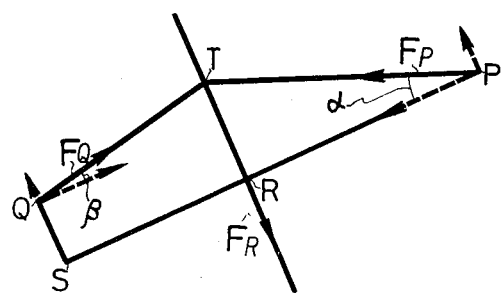
INVENTORS.
MASANAO SHIOMI,
TADATAKA NARUMI,

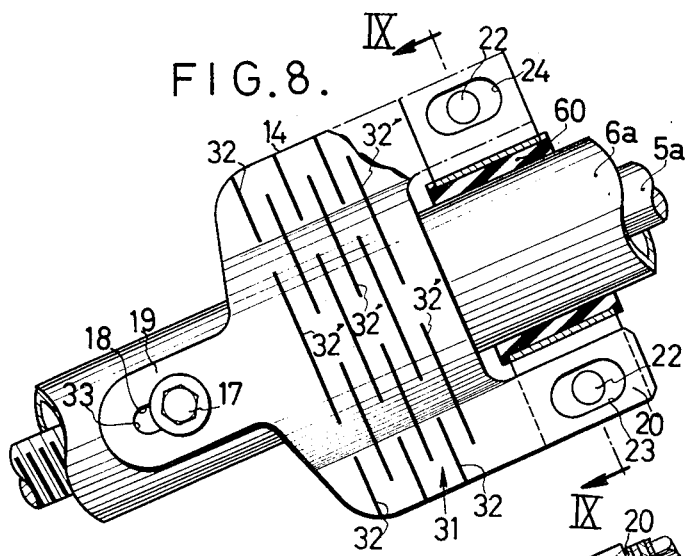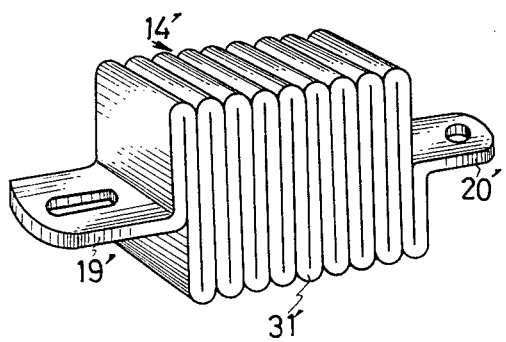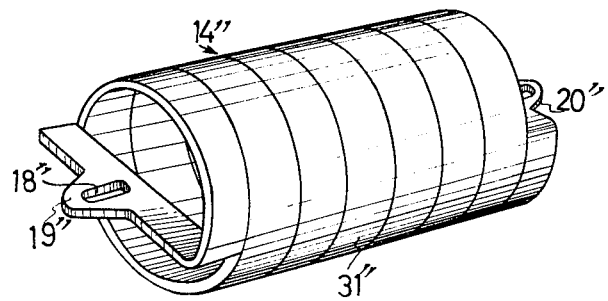

Patented Aug. 10, 1971
3,597,994
5 Sheets-Sheet 5
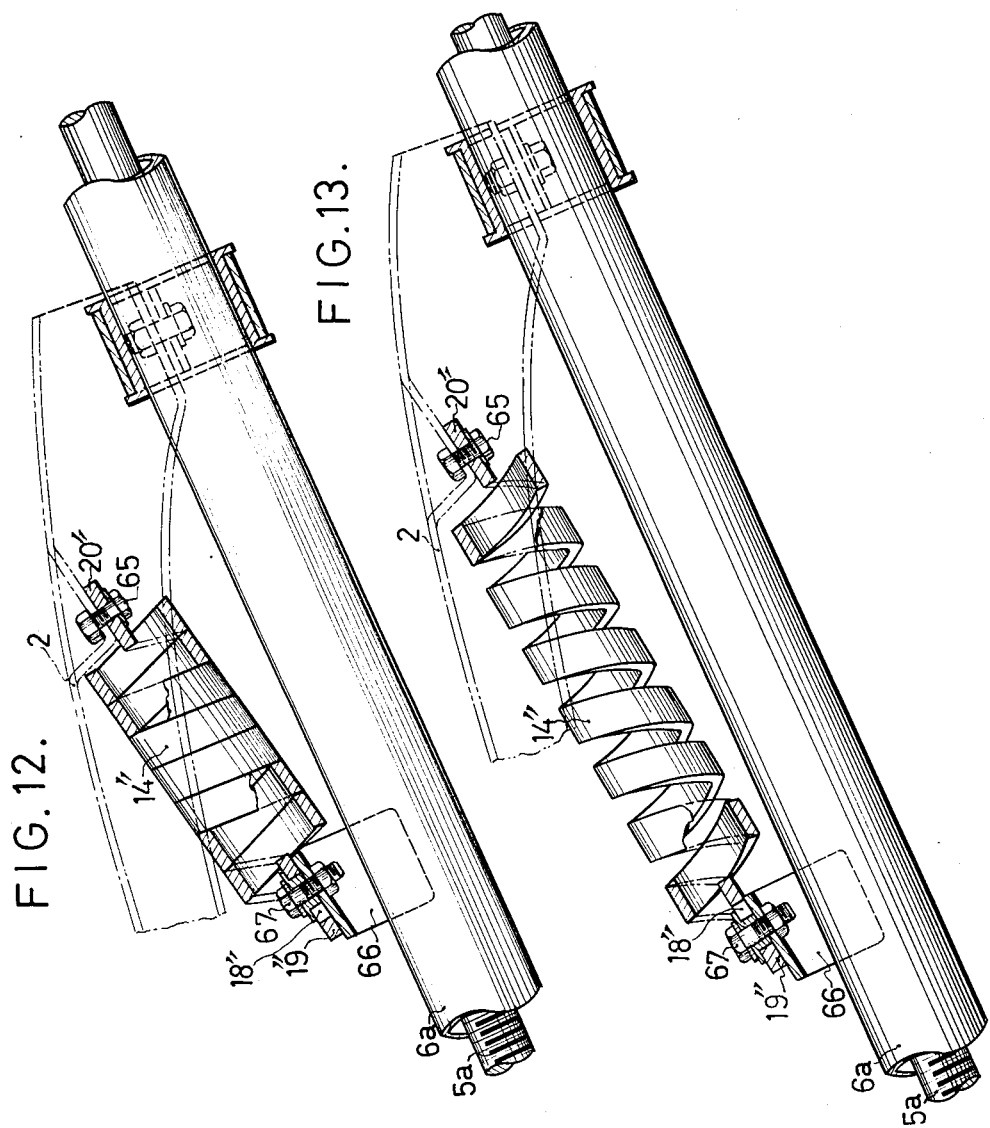
INVENTORS.
MASANAO SHIOMI,
TADATAKA NARUMI,
BY Berman, Davidson & Berman,
ATTORNEYS.

STEERING DEVICE WITH ENERGY ABSORBER

BACKGROUND OF THE INVENTION

This invention relates to steering assemblies, and more particularly to a steering assembly combined with an energy-absorbing member, said assembly being capable of telescopic movement in response to imposition of a predetermined axial load thereon.

The recent increase of speed and power of automobiles has made it socially important to safeguard the car and its occupants during inadvertent collisions which often cause injuries to the driver, or other occupants of the vehicle.

The present invention is intended to overcome this problem by providing a steering device in the car including an energy absorber for protecting the operator from injuries.

At present, most conventional steering devices are so constructed that neither the steering shaft carrying the steering wheel, nor the wheel post, or column rotatably supporting said shaft, are capable of extension or retraction in the axial direction. With this construction, and as a result of inertia and the running speed of the vehicle when an accidental collision occurs, the operator is usually thrown forwardly and struck a blow on the chest by the steering wheel, frequently suffering mortal injury.

Recently steering wheel assemblies have been developed which include telescoping sections enabling the steering shaft to retract the axial direction and to absorb a portion of the collision shock so as to decrease the intensity of the blow of the steering wheel against the chest of the operator. Although a few such devices have been marketed, these still involve defects and disadvantages, for example, in the physical characteristics of the energy-absorbing member, its means of attachment, and its mode of operation.

SUMMARY

The present invention provides a steering wheel assembly having an extensible steering shaft whose upper end is connected to a steering wheel and whose lower end is connected to a gear box. A telescopic tubular steering post is integrated with said steering shaft and movable therewith in the axial direction. An anergy-absorbing member is connected between the tubular steering post and the vehicle chassis at an angle to the axis of the steering shaft. The energy-absorbing member is capable of plastic deformation in one direction only, either the direction of tension of compression, and is rigid in the opposite direction, and so arranged as to deform in a direction corresponding to that of the downward retracting movement of the steering shaft. Thus, the invention affords a novel energy-absorbing member having excellent performance and which is very safe for the operator, as well as an ideal combination of said energy-absorbing member with other components of the steering wheel assembly.

It should be apparent from the preceding summary that the principle object of the invention is to provide an improved steering wheel device which will obviate the above briefly described defects and disadvantages of conventional devices and which will enable safer operation of vehicles equipped therewith.

BRIEF EXPLANATION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

FIG. 5 is a cross-sectional view taken along the line V-V of FIG. 3, showing the bracket support of the steering device and energy-absorbing member;

FIG. 6 is a diagrammatic view showing a correct angle of attachment for the energy-absorbing member;

FIG. 7 is a diagram showing the relationship of acting forces at points designated in FIG. 6;

FIGS. 8 and 9 illustrate other embodiments of the bracket support, FIG. 8 being a plan view corresponding to FIG. 3, and FIG. 9 being a cross-sectional view taken along the line IX-IX FIG. 8;

FIGS. 10 and 11 are perspective views showing other embodiments of the energy-abosrbing member; and FIGS. 12 and 13 illustrate mounting a steering device including the energy-absorbing member of FIG. 11; FIG. 12 being a side view of the assembly before the energy-absorbing member absorbs energy; and FIG. 13 being a side view of the same assembly after the energy-absorbing member has absorbed the energy of a collision.

DESCRIPTION OF THE

PREFERRED EMBODIMENTS

Figure 1:
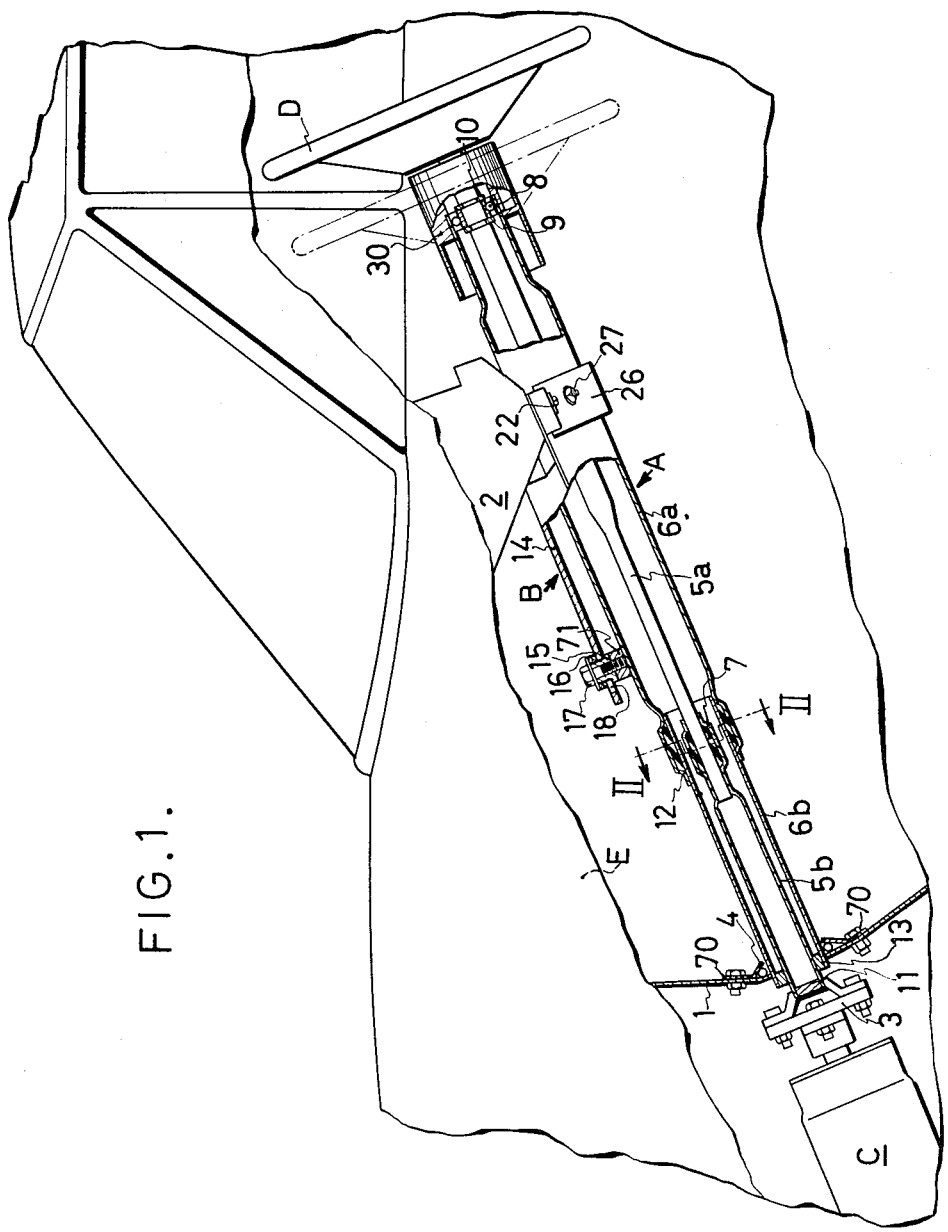
FIG. 1 is a fragmentary side elevation of a motor vehicle partially broken away and partially in section to reveal a steering device with an energy-absorbing member according to the invention.

Referring now more particularly to the drawings, a steering device A according to the invention is shown to comprise a telescopic steering shaft formed in upper and lower portions 5a and 5b coaxial with and surrounded by a telescopic, tubular steering post, or column, in which the shaft rotates. Combined with these is a novel energy-absorbing member and supporting parts generally indicated by the reference character B. The steering wheel device is shown installed in an automobile having conventional parts such as a gearbox C, steering wheel D, body or chassis E, a firewall separating the engine and driver compartments and having a lower portion, or toe plate 1, and an instrument panel 2. The gearbox C is rigidly fixed to the chassis in a conventional manner, not shown. The upper portion 5a of the steering shaft is connected to the steering wheel D, while the lower portion 5b is connected to the gearbox C through a conventional flexible joint 3 so as to transmit the torque of the steering wheel to the gearbox. The lower steering shaft portion 5b passes through a low-friction ring 4 positioned about an opening in the tow plate 1, and the upper por tion 5a is connected to the instrument panel 2 through the energy-absorbing device B, as will be more fully explained later. The tubular steering post 6 has two telescopic portions, 6a and 6b, surrounding the corresponding telescopic portions 5a and 5b of the shaft.

Figure 2:
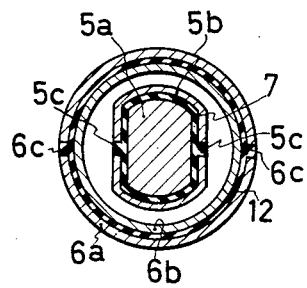
FIG. 2 is a cross-sectional view taken along the line II-II of FIG. 1.

The steering shaft upper portion 5a is formed as a bar, while the lower portion 5b is a cylindrical tube, both being arranged to have a common axis. The lower end of portion 5a is telescopically fitted into the upper end of portion 5b, so as to be capable of extending and retracting in the axial direction, but relative rotary motion is restricted so as to transmit the steering torque. Particulars of this construction are presented in FIG. 2 in which the member 5a has a circular cross section flattened at opposite diametrical areas to present parallel, planar sides. The cylindrical member 5b is correspondingly flattened to receive the member 5a with a close fit. Thus, the members 5a and 5b can telescope, or slide axially with respect to each other, but both must revolve together without relative rotary motion. During manufacture, synthetic resin 7 is injected under compression between the fitting surfaces of the members 5a and 5b through a small hole 5c provided on the lower member 5b, while said members 5a and 5b are fitted together so as to remove play during rotation.

The upper end of steering shaft 5 is connected to the steering wheel D and rotates in ball bearings 8 held from axial movement by snap rings 9 and 10. The outer race of ball bearings 8 is fastened to the upper steering column member 6a, A dust keeper 11 is provided at the lower end of the steering shaft member 5b to prevent the entrance of dust, mud, water, etc.

The steering column upper member 6a is of larger diameter than the lower member 6b, being coupled at II for telescopic movement, and the two members are arranged coaxial with the steering shaft 5a-5b. Coupling II involves closely interfitting the lower end of 6a to the upper end of 6b in such manner that they may move relative to one another to extend or retract the column 6 in the axial direction. A synthetic resin 12 is injected under compression between the fitting surfaces of 6a and 6b through a small hole 6c in the upper member 6a during manufacture. The interfit at coupling II is sufficiently tight as to normally prevent relative axial movement of the members 6a and 6b, as well as bending in the absence of an unusual force such as engendered in a collision. The molded synthetic resins 7 and 12 will in no way obstruct the relative extension and retraction movements of the members 5a, 5b, and 6a, 6b when subjected to collision forces, both resins yielding to permit relative sliding movements with slight friction between the respective portions of the steering shaft and steering column.

The lower steering column member 6b is loosely fitted through the hole in the toe plate 1 surrounded by the friction ring 4. This ring is closely fitted to the outer periphery of member 6b and connected to the toe plate by an annular attaching member 70 secured by bolts. The ring 4 supports the lower member 6b to be immovable radially without preventing movement in the axial direction. A dust keeper 13 is provided between the steering shaft 5b and steering column member 6b to prevent entrance of dust, mud, water, etc., into the steering column 6.

Figure 3:
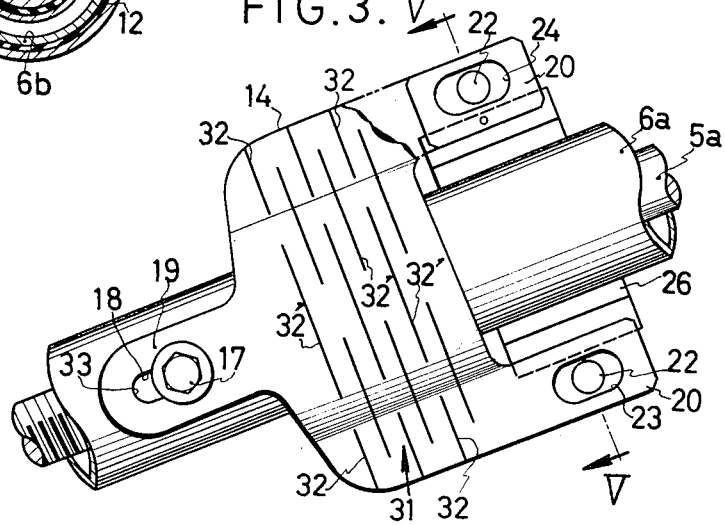
FIG. 3 is an enlarged plan view of the energy-absorbing member of FIG. 1 and its attaching device, showing the normal condition of the member before it absorbs energy.
Figure 4:
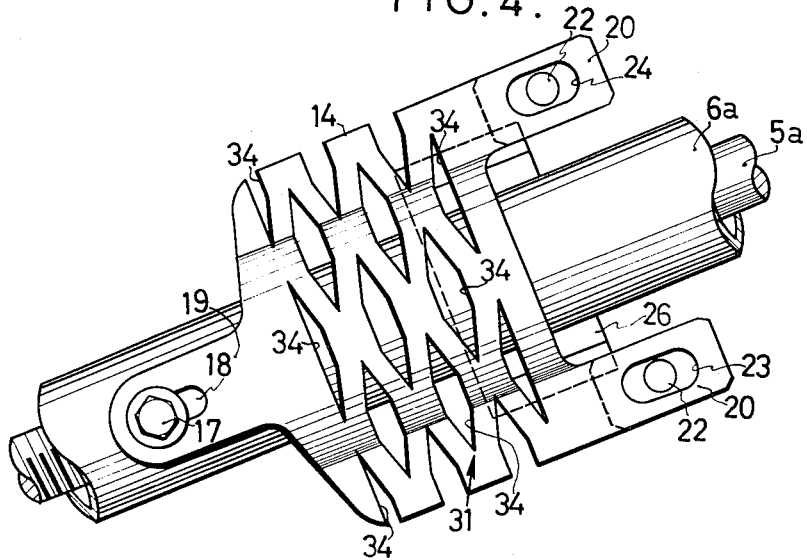
FIG. 4 is a plan view of the energy-absorbing member after it has absorbed energy.

The steering column upper portion 6a is attached to the instrument panel 2 through the energy-absorbing device B as illustrated in detail in FIGS. 3 to 5. The energy-absorbing member, per se, is a semicircular plate designated 14, having a lower projecting tongue 19 which is rigidly fastened to the member 6a by bolt 17 and small friction bushings 15 and 16, FIG. 1. The bolt 17 passes through an elongated slot 18 disposed axially of the tongue. Normally, the bolt 17 is tightened adjacent to the upper end of the slot 18, as shown in FIG. 3.

A pair of projecting tongues 20 are formed at the upper end of plate 14. Each tongue is longitudinally slotted at 23, 24 to receive a bolt 22, which, as shown in FIG. 5, passes through the slots and holds plate 14 and spacer guide 21 to the instrument panel 2. Normally, the bolts 22 are fastened approximately in the middle of slots 23 and 24. On the upper steering column member 6a are welded internally threaded, cuplike spacers 25 to which are secured a semicircular bracket 26 by threaded bolts 27. The bolts pass through apertures in the bracket and firmly secure the latter to member 6a. Each guide 21 is somewhat elongated to overlie a substantial portion of the adjacent tongue 20. A longitudinal groove 28 is provided in the inner side surface of the guide and an end tab of said bracket 26 is slidably fitted in the groove through the small friction member 29. The guide members 21 are fixed to the instrument panel 2 by means of the bolts 22 which pass through openings therein. Since the fastening bolts 22 are spaced from the bracket grooves 28, the bracket can move in the grooves longitudinally of the guide members 21 relative to the instrument panel either upwardly or downwardly parallel to the axis of the steering column 6.

The lower tongue 19 of the energy-absorbing plate 14, as shown in FIG. 1, has a small friction bushing 15 disposed between itself and the spacer collar 71 projecting from the outer periphery of the steering column portion 6a, and another small friction bushing 16 between the washer on the bolt 17 and the tongue 19. The bolt is threaded to spacer 71 whose lower end is welded, or otherwise firmly secured to the steering column 6a.

The upper end of the steering column portion 6a has an inverted cuplike cover 30 integrally coupled therewith, which cover carries and supports the outer race of the ball bearings 8 rigidly fixed by their lower race to the steering shaft upper portion 5a. Consequently, the steering column 6 rotatably supports the steering shaft 5.

The energy-absorbing element, or plate 14, secured by tongues 19, 20, as above described, is formed as a semicircular plate of metal, metal alloy, or other suitable rigid, but slightly resilient material such as sheet steel. The middle portion 31 of plate 14 is made plastically deformable to absorb energy by provision of a plurality of narrow slits 32' preferably disposed in parallel lines, with the slits of adjacent lines staggered. The lines of slits are perpendicular to the axial direction of the steering assembly as shown in FIG. 3, whereby a number of strips 32, partly interrelated with each other, are delineated by the slits. The strips 32 are in close contact with each other, almost without interspace, so that the plate portion 31 is rigid against compressive force exerted axially on the upper and lower tongues 20 and 19, and such forces will not vary the length of the plate 14. However, tensile axial forces, exceeding a predetermined value, when exerted on the tongues 19, 20 result in plastic deformation, causing plate 14 to take a grid form, as shown in FIG. 4, the slits opening wide to form spaces 34, and the length of plate 14 is increased. By such plastic deformation into grid form, the load energy is absorbed in the amount desired, or required.

The steering device as described above operates as follows. Upon accidental collision, when the vehicle operator's chest strikes the steering wheel D, the upper steering shaft member 5a moves downwardly and retracts into the lower member 5b. With movement of the steering shaft 5, the steering column upper member 6a also retracts into the lower member 6b. During such retraction movements of the members 5a and 6a, the energy absorbing plate 14 fastened between the upper member 6a and the instrument panel 2 will have its midportion 31 elongated by the resultant tensile force. The plastic deformation of portion 31 of the energy-absorbing member 14 absorbs the kinetic energy of the steering shaft 5 produced by the collision.

The described action of absorbing energy will be amplified as follows. When the operator is thrown toward the steering wheel D and the striking force thus produced exceeds a predetermined value, there will occur a sliding in the telescopic fitting portions of the connected parts opposed by little friction. That is, in the wheel shaft 5, the synthetic resin 7 permits retraction of the upper member 5a opposed only by moderately small frictional forces between the interfitting portions of the upper and lower members 5a and 5b, and also in the steering column 6 the synthetic resin 12 permits retraction of the upper member 6a opposed only by moderate friction forces between the interfitting portions of the upper and lower members 6a and 6b. The bracket 26 integrated with the steering column upper member 6a slides downwardly along the groove 28 of the guide member 21, attached to the instrument panel 2 by bolts 22, and is opposed by a small amount of friction through the low friction member 29. Thus, the interfitting portions of the steering shaft and column pass from a static frictional condition to a dynamic, small frictional movement, whereupon the bolt 17 holding the member 6a will move to contact the lower end 33 of the slot 18 and carry the tongue 19 downwardly, stretching the energy-absorbing midportion 31 of the plate 14 so as to open the slits 32' and thereby absorb the desired energy. Thus, the strips 32 are plastically deformed gradually into grid form with spaces 34, shown in FIG. 4. This plastic deformation absorbs the shock of the operator striking the wheel. Therefore, as the chest of the operator strongly strikes the steering wheel, the absorption action of plate 14 soaks up the energy of collision in such a way that the operator is protected against damage, to a large extent.

An upward movement of the steering assembly A is caused by a frontal collision when the front portion of the chassis is deformed and the gearbox C is moved rearwardly. The rearward movement of said gearbox is transmitted upwardly to the lower steering shaft portion 5b through the flexible joint 3. Under this condition the upper steering shaft portion 5a transfers much of the force of collision upwardly in the axial direction to the energy-absorbing plate 14 through the ball bearings 8, cover 30, and upper steering column portion 6a. Since the energy-absorbing plate 14 is not plastically deformable under compressive loads, the midportion 31 of said absorbing member 14 will remain rigid, while the upper steering column portion 6a remains relatively fixed, being prevented from upward movement by the fastening to the instrument panel 2. Thus, the respective lower members 5b and 6b will retract upwardly into the upper members 5a and 6b without raising the wheel D to strike the operator, so that his safety is guarded, as it is in the reverse situation wherein the operator is thrown downwardly against the steering wheel D.

As may be understood from the preceding description, a novel feature of the invention resides in that the energy-absorbing element is not an integral part of the steering shaft assembly A, nor even a surrounding coaxial part, as has been employed conventionally, but instead is a separate unit individually disposed between the steering shaft and a chassis or body portion of the vehicle. This makes it possible to reuse the energy-absorbing unit, or to replace the absorbing unit if the steering shaft assembly A remains connected and unharmed after a collision. By provision of a separate and individual energy-absorbing member it is also possible to apply such member to all varieties of cars, even though having different steering shaft assemblies, so long as they require the same amount of energy absorption, whereby larger quantities of absorbing members can be produced, and their cost lowered.

The greatest advantage of providing a separate energy-absorbing member is that the steering wheel can be constructed to fulfill the kinetic requirements of the device by selecting the angle of attachment of the absorbing member. The reason for this will be explained now with reference to FIGS. 6 and 7. Assume that the force of shock from striking the operator acts on the central point of the steering wheel at an angle of $\alpha$. To absorb this force of shock in the energy-absorbing member 14 in a stable manner, the retraction of the lower member 6b and the upper member 6a of the steering column must be carried out smoothly with little frictional opposition. Thus, the energy absorbing member 14 is attached and inclined at an angle $\beta$ relative to the axis of the steering wheel assembly. The appropriate selection of the angle $\beta$ can eliminate a bending couple 55 and a force 56 at right angle to the axis exerted on the interfitting parts of the upper and lower portions 6a and 6b of the steering column. The formula, or graphical mode for selecting a proper angle $\beta$ is shown in FIG. 7. The line PS is the axis of the steering shaft on which a force $E_P$ from the operator acts at point P, inclined upwardly at an angle $\alpha$. Force $F_R$ acts on a point R in a direction at right angles to the axis of the steering shaft. The force of energy absorption FQ is inclined in angle $\beta$ to the axis and acts at a point Q having eccentricity SQ. The eccentricity SQ can be zero. To ascertain the direction of FQ, with knowledge of the directions $F_P$ and $F_R$, it is first required to obtain a crossing point T on the line of direction PT of force $F_P$ and a line of direction RT of force $F_R$. Then the acting points Q and T of the energy-absorbing force are connected. The energy-absorbing member 14 must then be disposed in the direction of the line QT making the angle $\beta$ with the steering assembly axis. When the angle $\beta$ has been determined in the above described manner, the force of shock 52, FIG. 6, force of support 54, and force of absorption 53 are kinetically balanced so that there will not be generated a bending couple 55 nor a force 56 at right angle to the axis. As a result, a good retracting movement of the telescoping steering assembly parts with little frictional opposition is carried out while member 14 absorbs the energy of collision. In conventional apparatus where the energy-absorbing element is provided as an integral part of the steering shaft, or coaxially surrounding the same, the energy-absorbing member is disposed and acts only in the axial direction and cannot provide a correct and more efficient shock absorption angle as in the present invention.

Another feature of the present invention is that the absorption of energy is accomplished by relative displacement of parts with respect to the instrument panel so as to result in a very small deformation at the time of collision, while in conventional devices having energy-absorbing elements integrally aligned in, or parallel to the steering shaft, the energy absorption is affected by the gearbox, or toe plate, and result in very large displacement and deformation of the front of the chassis or body upon collision.

FIGS. 8 and 9 show a modified bracket assembly for attaching the steering column upper portion 6a to the instrument panel 2. A relatively thin, annular friction bushing 60 is positioned between the bracket 26 and the member 6a in place of the spacers 25 of FIG. 5. A semicircular unnumbered bracket similar to bracket 26 supports the opposite side of bushing 60. Accordingly, the upper steering column member 6a is movable upwardly or downwardly axially of the column with slight frictional opposition interposed by bushing 60. The bracket 26 as well as the opposed unnumbered bracket is attached to the instrument panel 2 directly by bolts 22 passing through the upper tongues 20 of the energy-absorbing plate 14. The guides 21, as in the FIG. 5 embodiment, are omitted as being unnecessary.

FIG. 10 illustrates another embodiment of the energy-absorbing member in which the midportion 31' comprises folded touching laminations arranged perpendicular to the axis of the member and the steering shaft. There are no spaces but slits between laminations. This midportion 31' is elongated to separate the lamination by plastic deformation upon application of tensile force to the upper tongue 20' and lower tongue 19', but remains rigid without producing plastic deformation under the application of compressive force to the end tongues.

FIG. 11 illustrates still another embodiment of the energy-absorbing member in which the midportion 31" is formed as a coil of spiral, or helical, loops which touch, without separating spaces, so as to form a continuous cylindrical surface. As in the FIG. 10 embodiment, the slits of this coil will separate by plastic deformation upon application of tensile force to the tongues 19" and 20", and the coil is elongated, but it remains rigid against deformation upon application of compressive force between the tongues.

FIGS. 12 and 13 illustrate the energy-absorbing member shown in FIG. 11 connected to the steering wheel assembly and vehicle. The difference from the connection shown in FIGS. 1 and 5 is that the upper tongue 20" of the absorbing member 14" is directly fixed to a lower portion of the instrument panel 2 by a bolt 65 without being also connected to bracket 26 supporting the upper part of the steering column. In this embodiment said upper part of the steering column is separately supported from the instrument panel, for sliding movement, by bracket and bushing parts resembling parts 26 and 60 of FIG. 9. The lower tongue 19" is secured to a bracket 66 welded, or otherwise firmly secured, to the upper steering column member 6a by bolt 67. FIG. 12 shows the condition of the energy absorbing coil before it absorbs energy of a collision while FIGS. 13 shows the extended condition after absorption of energy.

All embodiments of the energy-absorbing member 14 as hereinbefore described are intended to plastically deform and elongate under tensile forces, while retaining rigidity under compressive forces. It will thus be clear to one skilled in the art that the absorbing member may be designed to operate inversely so as to deform under compressive force, while retaining rigidity under tensile force. Accordingly, such variation in design is encompassed in the present invention. The amounts of energy to be absorbed by the energy-absorbing member 14 will vary depending upon the shape and size, as well as material of the absorbing member. By selection of a preferred material and thickness of the absorbing plate 14, it is possible to obtain a predetermined amount of absorption as desired.

The invention illustrated and described herein may obviously be provided on the steering wheel assemblies incorporating variable speed levers.

As may be understood clearly from the above description, the steering wheel assembly of the present invention is characterized by simple construction and excellent performance which includes one or more of the following characteristics and advantages:

The energy-absorbing member is deformed and elongated upon relative displacement of the steering shaft and the chassis and absorbs the shock of collision in a stable manner.

The energy-absorbing member is plastically deformed in one direction so as to absorb the shock, but suffers no deformation in the opposite direction, being rigid in the latter direction.

When the vehicle operator is thrown against the steering wheel, the steering shaft retracts being opposed by little frictional resistance. Similarly retraction occurs upon upward movement and deformation of the forward end of the vehicle chassis.

The energy-absorbing member is designed so as to deform after the associated parts have passed from the state of static friction to the state of low-dynamic friction, reducing the variation of force of shock.

The energy-absorbing device is an independent unit provided apart from the steering device. It can, therefore, be applied to any steering shaft of the extensible type, if the amount of shock to be absorbed is the same, even though the design of the steering shaft differs depending on the vehicle dimensions.

The energy-absorbing device being separate from the steering shaft may be attached at a suitable angle to achieve kinetic stability and avoid bending couples.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

We claim:

1. In a vehicle including a steering gear, a steering wheel, a steering shaft assembly connecting the gear to the wheel and an energy-absorbing member, the improvement wherein said steering shaft assembly comprises an axially retractable steering shaft means connected at its lower end to the steering gear and at its upper end to the steering wheel and an axially retractable tubular column surrounding said shaft means and coaxial therewith, the upper portion of said shaft means being connected to the steering wheel, said shaft means being in rotatable relation with said tubular column, said energy-absorbing member being positioned independently of and in side-by-side relation with said steering shaft assembly, said energy-absorbing member being fixed at its lower end to a portion of said tubular column and at its upper end to another portion of the vehicle, said energy-absorbing member having at least one closed slit substantially perpendicular to the axis of said steering shaft assembly and being plastically deformable in one direction but rigid against deformation in the opposite direction, said slit being opened wide by plastic deformation of the member to absorb the shock of a collision engendered force tending to move said steering shaft means downwardly toward the steering gear.

2. The improvement set forth in claim 1, wherein said independent energy-absorbing member is disposed at an angle to the axis of said steering shaft means so as to kinetically balance a collision force directed at an angle to the axis of said steering shaft means to thereby prevent binding of said shaft means.

3. The improvement set forth in claim 1, wherein said energy-absorbing member includes a plate having a plurality of narrow slits therein arranged in lines perpendicular to the longitudinal axis of said steering shaft assembly, the slits of one line being staggered in relation to those of the adjacent line, said slits being opened wide by plastic deformation of the plate to absorb the shock of a collision engendered force tending to move said steering shaft means downwardly toward the steering gear.

4. The improvement set forth in claim 1, wherein said energy-absorbing member includes an elongated rectangular bar folded in its central portion to provide a plurality of slits formed between touching laminations each substantially perpendicular to the longitudinal axis of the bar, said laminations being separable by plastic deformation of the bar to absorb the shock of a collision engendered force tending to retract the steering shaft means downwardly.

5. The improvement set forth in claim 1, wherein said energy-absorbing means includes a coil having a continuous normally closed helical slit, said slit being opened wide by plastic deformation of the coil to absorb the shock of a collision engendered force tending to move said steering shaft means downwardly toward the steering gear so as to be plastically deformable in one direction but rigid against deformation in the opposite direction.